United States Patent
Granger

(10) Patent No.: US 11,325,069 B2
(45) Date of Patent: May 10, 2022

(54) METHOD AND APPARATUS FOR REMOVING NOX AND N2O FROM A GAS

(71) Applicant: Casale SA, Lugano (CH)

(72) Inventor: Jean François Granger, Lugano (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 15/765,395

(22) PCT Filed: Oct. 28, 2016

(86) PCT No.: PCT/EP2016/076152
§ 371 (c)(1),
(2) Date: Apr. 2, 2018

(87) PCT Pub. No.: WO2017/072332
PCT Pub. Date: May 4, 2017

(65) Prior Publication Data
US 2018/0280873 A1    Oct. 4, 2018

(30) Foreign Application Priority Data

Oct. 28, 2015 (EP) .................................. 15191816

(51) Int. Cl.
*B01D 53/86* (2006.01)
*B01J 23/22* (2006.01)
*B01J 29/072* (2006.01)

(52) U.S. Cl.
CPC ....... *B01D 53/8628* (2013.01); *B01D 53/869* (2013.01); *B01D 53/8631* (2013.01); *B01D 53/8696* (2013.01); *B01J 23/22* (2013.01); *B01J 29/072* (2013.01); *B01D 2251/2062* (2013.01); *B01D 2255/20723* (2013.01); *B01D 2255/20738* (2013.01); *B01D 2255/20761* (2013.01); *B01D 2255/50* (2013.01); *B01D 2257/402* (2013.01); *B01D 2257/404* (2013.01); *Y02C 20/10* (2013.01)

(58) Field of Classification Search
None
See application file for complete search history.

(56) References Cited

U.S. PATENT DOCUMENTS

| | | | |
|---|---|---|---|
| 2,970,034 A | 1/1961 | Andersen et al. | |
| 3,467,492 A | 9/1969 | Newman | |
| 4,049,777 A | 9/1977 | Divivier et al. | |
| 4,081,511 A | 3/1978 | Laue et al. | |
| 6,182,443 B1 | 2/2001 | Jarvis et al. | |
| 6,890,501 B2 | 5/2005 | Delahay et al. | |
| 7,393,512 B2 | 7/2008 | Schwefer et al. | |
| 7,462,340 B2 * | 12/2008 | Schwefer | B01D 53/8628 423/239.1 |
| 7,744,839 B2 | 6/2010 | Schwefer et al. | |
| 9,238,196 B2 * | 1/2016 | Schwefer | B01D 53/8631 |
| 9,302,222 B2 | 4/2016 | Perbandt | |
| 2002/0127163 A1 | 9/2002 | Chen et al. | |
| 2003/0143141 A1 | 7/2003 | Schwefer et al. | |
| 2003/0143142 A1 | 7/2003 | Schwefer et al. | |
| 2005/0284134 A1 | 12/2005 | Radhamohan et al. | |
| 2006/0051277 A1 | 3/2006 | Schwefer et al. | |
| 2008/0044331 A1 | 2/2008 | Schwefer et al. | |
| 2008/0044334 A1 * | 2/2008 | Pieterse | B01J 29/46 423/239.2 |
| 2010/0024393 A1 * | 2/2010 | Chi | F01N 3/106 60/276 |
| 2010/0266469 A1 | 10/2010 | Maunula et al. | |
| 2013/0149225 A1 | 6/2013 | Schwefer et al. | |
| 2013/0336872 A1 * | 12/2013 | Schwefer | B01D 53/8628 423/392 |
| 2014/0044636 A1 | 2/2014 | Dandekar et al. | |
| 2014/0363359 A1 | 12/2014 | Schwefer et al. | |
| 2015/0113966 A1 | 4/2015 | Kamasamudram et al. | |
| 2015/0336051 A1 | 11/2015 | Bruckner et al. | |

FOREIGN PATENT DOCUMENTS

| | | | |
|---|---|---|---|
| DE | 3532209 A1 | | 3/1987 |
| DE | 4440833 A1 | | 2/1996 |
| DE | 19859003 A1 | | 6/2000 |
| EP | 0818232 | * | 4/1997 |
| EP | 1286027 A1 | | 2/2003 |
| EP | 1355725 B1 | | 10/2004 |
| EP | 1475140 A1 | | 11/2004 |
| EP | 0818232 B1 | | 6/2006 |
| GB | 2162830 A | | 2/1986 |
| WO | 2013087181 | * | 6/2013 |

(Continued)

OTHER PUBLICATIONS

International Search Report dated Jan. 18, 2017 in connection with PCT/EP2016/076152.
International Preliminary Report on Patentability issued in connection with PCT/EP2016/076152.
Perez-Ramirez el al., "Formation and control of N2O in nitric acid production—where do we stand today?" Applied Catalysis B: Environmental 44 (2003) 117-151.
Kapteijn et al., "Heterogenous catalytic decomposition of nitrous oxide," Applied Catalysis B: Environmental 9 (1996) 25-64.
Perez-Ramirez et al., "Dual-bed catalytic system for NOx—N2O removal: a practical application for lean-burn deNOx HC—SCR," Applied Catalysis B: Environmental 25 (2000) 191-203.

(Continued)

*Primary Examiner* — Sheng H Davis
(74) *Attorney, Agent, or Firm* — Akerman LLP

(57) ABSTRACT

Method for reducing the content of nitrogen oxides NOx and nitrous oxide N2O in an input gas, comprising the steps of: treating said gas with a first amount of a NOx reducing agent in a first de-NOx catalytic bed; treating the effluent of said first de-NOx catalytic bed in at least one de-N2O catalytic bed for removal of N2O; treating the effluent of said at least one de-N2O catalytic bed with a second amount of a NOx reducing agent in a second de-NOx catalytic bed.

17 Claims, 2 Drawing Sheets

(56) References Cited

FOREIGN PATENT DOCUMENTS

WO 2015/130219 A1 9/2015

OTHER PUBLICATIONS

European Commission, Large Volume Inorganic Chemicals—Ammonia, Acids and Fertilisers, Chapter 3.4.8, pp. 130/131 (Aug. 2007).

Mauvezin et al., "Catalytic reduction of N2O by NH3 in presence of oxygen using Fe-exchanged zeolites," Catalysis Letters (1999) 41-44.

R. W. van den Brink et al., "Selective catalytic reduction of N2O and NOx in a single reactor in the nitric acid industry," Catalysis Today, 75 (2002) 227-232.

Coq et al., "The simultaneous catalytic reduction of NO and N2O by NH3 using Fe-zeolite-beta catalyst," Applied Catalysis B: Environmental 27 (2000) 193-198.

Kumar et al., "Metal Exchanged ZSM-5 Zeolite Based Catalysts for Direct Decomposition of N2O," Catalysis Letters (2009) 132, 248-252.

Smit et al., Market Analysis DeN2O, Jacobs Engineering Nederland BV (May 2001) https://inis.iaea.org/search/search.aspx?orig_q=RN:33031226.

Perez-Ramirez et al., "Dual-bed catalytic system for NOx—N2O removal in the lean-burn deNOx HC—SCR," Fuel Chemistry Division Preprints 2001, 46(1) 72-74.

* cited by examiner

METHOD AND APPARATUS FOR REMOVING NOX AND N2O FROM A GAS

This application is a national phase of PCT/EP2016/076152, filed Oct. 28, 2016, and claims priority to EP 15191816.6, filed Oct. 28, 2015, the entire contents of both of which are hereby incorporated by reference.

FIELD OF THE INVENTION

The invention relates to systems for reducing the NOx and N2O content of a gas.

Prior Art

Many industrial processes discharge a gas containing nitrogen oxides (NOx) and nitrous oxide (N2O). In particular, any combustion process produces exhaust gases containing NOx and N2O. Another significant case is given by industrial production of nitric acid, which releases an offgas mainly consisting of nitrogen, Oxygen and unconverted NOx and N2O. The term nitrogen oxides or NOx collectively denotes nitrogen monoxide (NO) and dioxide (NO2).

NOx and N2O are known pollutants and the related emissions are subject to strict regulations. Hence a treatment of said combustion gas or offgas in a suitable de-NOx system is indispensable.

A prior art technique for removing NOx and N2O from a gas involves passing the gas over a sequence of two catalytic beds, wherein the first bed is to reduce the quantity of N2O and the second bed is to reduce the quantity of NOx. Elimination of NOx in the second bed is made possible by injection of ammonia as a reducing agent for NOx between the first bed and the second bed.

The above prior-art system is based on the finding that NOx accelerates the decomposition of N2O. Accordingly, ammonia for NOx abatement is only added after the passage in the first bed, so that the first step of de-N2O is facilitated by the NOx contained in the source gas.

The removal of N2O basically follows the reaction:

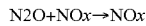

$$N2O+NOx \rightarrow NOx$$

while the removal of NOx follows:

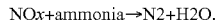

$$NOx+ammonia \rightarrow N2+H2O.$$

Hence the prior art teaches first to convert N2O into NOx and, subsequently, to remove NOx by a catalytic reaction with ammonia.

This technique, however, requires a very accurate regulation of the added ammonia and intensive mixing between ammonia and the gas, otherwise the target concentration of NOx may not be reached or some ammonia may escape the second bed (ammonia slip). A fluctuation of the process may cause the release of NOx and/or ammonia outside the limit, which causes an environmental impact and may generate an additional cost. For example, some countries prescribe that the release of ammonia into atmosphere is subject to a penalty fee, making ammonia slip undesirable. The maximum ammonia which is permitted is generally very low, for example 5 ppm. A further reason why ammonia slip is undesirable is the possible formation of ammonium nitrite or nitrate which can lead to damage of equipment, for example of a downstream expander.

Typically, the flowrate of ammonia must be regulated with accuracy of 1-2% which is difficult to obtain. For example a system for reduction of NOx and N2O can be designed to process a gas current containing about 1000 ppm and be required to output a gas with no more than 25 ppm of NOx and 5 ppm of ammonia. As the quantity of ammonia required to reduce NOx is about the same of the NOx, this means that added ammonia shall be precisely regulated between 975 and 1005 ppm to meet both above requirements. The range of regulation is +/−15 ppm, which means the required accuracy is 1.5% of the flowrate.

The above problem is more challenging as the requirement in terms of emissions of NOx and ammonia become more stringent in several countries.

SUMMARY OF THE INVENTION

The aim of the invention is to solve the above drawbacks of the prior art two-beds systems for abatment of NOx and N2O.

This aim is reached with a method and apparatus according to the attached claims. Preferred features of the invention are stated in the dependent claims.

The invention provides that nitrogen oxides NOx and nitrous oxide N2O are removed from an input gas by:

treating said input gas with a first amount of a NOx reducing agent in a first de-NOx catalytic bed;

treating the effluent of said first catalytic bed in a second catalytic bed for removal of N2O;

treating the effluent of said second catalytic bed with a second amount of a NOx reducing agent in a third de-NOx catalytic bed.

Preferably the NOx reducing agent is ammonia or contains ammonia. In the description, reference will be made to ammonia as a NOx reducing agent for simplicity.

An aspect of the invention is that ammonia is added in two separate steps. A first amount of ammonia is added to the gas before admission into the first bed, and a second amount of ammonia is added after the passage over the second bed for removal of N2O, and before admission into the third de-NOx bed.

The majority of NOx are removed in the first bed, which means that the majority of ammonia is added before said first bed. The first bed is designed to reach a low NOx content in the gas and, particularly, to ensure that no ammonia will remain in the effluent gas leaving said first bed. For example the effluent of the first bed may contain 50 to 200 ppm of NOx (as NO and NO2). The NOx content is preferably determined as the minimum required to provide the desired subsequent removal of N2O. Then, a relatively small amount of ammonia is added after the passage over the de-N2O bed, in order to remove the residual NOx and reach the target concentration, which may be for example 25 ppm.

In this description and in the attached claims, the term ppm denotes parts per million in volume.

The invention provides that a substantially ammonia-free and low-NOx gas is produced after treatment in a first catalytic bed, having a content of NOx which is as low as possible, taking into account the need of some NOx for subsequent N2O removal in a second bed. Then, residual NOx are removed in a third bed and with an addition of a second amount of ammonia which is smaller and easier to control than the first amount.

The second amount of ammonia is strictly determined by the amount of NOx in the effluent of the second bed. For example a residual amount of 200 ppm NOx would require an addition of ammonia corresponding to 200 ppm. Assuming a setpoint of 190 ppm and maximum deviation of +/− 15 ppm, accuracy is 8% compared to 1.5% of the prior art. Accordingly, the control of the ammonia flow is easier. With a lower amount of ppm NOx in the gas, the accuracy becomes higher, namely easier to obtain. In the above example, 100 ppm of NOx would correspond to 16.7% accuracy of the ammonia flow control and 50 ppm would correspond to 37.5% accuracy.

Accordingly, the great advantage of the invention is the system being able to reduce or eliminate the risk of excursion out of the limit and being able to operate under more stringent regulation. For example, the invention may obtain a final concentration of: less than 25 ppm of NOx, less than 30 ppm of N2O, less than 2 ppm of ammonia.

The three catalytic beds may have any suitable catalyst. Particularly, the two de-NOx catalytic beds may have the same or a different catalyst. According to preferred embodiments, the catalyst of the first bed (first de-NOx) is copper exchanged zeolite; the catalyst of the second bed (de-N2O) is iron exchanged zeolite; the catalyst of the third bed (second de-NOx) is Vanadium oxide. In some embodiments, also an iron-based catalyst may be used for the first and/or the second de-NOx catalytic bed.

In a preferred embodiment the second de-NOx catalytic bed comprises a catalyst which is iron exchanged zeolite and the gas admitted into said second catalytic bed has a molar ratio of NH3/NOx greater than 1.33. Said molar ratio NH3/NOx is understood as molar ratio of ammonia to the sum of NO and NO2. Even more preferably said ratio is greater than 1.4. A more preferred ratio is in the range 1.4 to 1.6. More preferably said ratio is 1.5 or about 1.5. Still more preferably, said iron exchanged zeolite catalyst of the second catalytic bed operates at a temperature around 430° C.

In a preferred embodiment, both the first and second de-NOx catalytic beds comprise iron exchanged zeolite catalyst. More preferably, the first catalytic bed operates with NH3/NOx less than 1 to keep some NOx in the gas for subsequent removal of N2O.

The applicant has found that the above conditions of de-NOx bed result in a virtually absent ammonia slip, typically less than 1 ppm. Also, a removal of almost all N2O (greater than 99%) is reached. Accordingly the invention allows meet the most stringent limits of NH3 and NOx.

According to some embodiments, an apparatus for reducing the content of NOx and N2O in a gas, comprises at least: a first de-NOx catalytic bed and a device arranged to introduce a first amount of a NOx reducing agent in the input gas, so that the input gas is treated in the first de-NOx bed with the first amount of reducing agent; a de-N2O catalytic bed arranged to treat the effluent of said first de-NOx catalytic bed to remove N2O, and a second de-NOx catalytic bed and a device arranged to introduce a second amount of a NOx reducing agent in the gas effluent from said de-N2O catalytic bed, so that said effluent is treated in the second de-NOx bed with the second amount of reducing agent.

The three catalytic beds may be arranged in one or more separate pressure vessels or in the same pressure vessel.

The catalytic beds, according to various embodiments, can be traversed axially or radially by the gas flow.

In a preferred embodiment, at least two catalytic beds are contained in a single pressure vessel. For example in one embodiment the first and the second bed are contained in the same pressure vessel; in another embodiment the second and the third bed are contained in the same pressure vessel; in another embodiment the three beds are all contained in the same pressure vessel.

According to some embodiments, the catalytic beds contained in a single pressure vessel can be arranged one above the other or, as an alternative, they can be arranged concentrically.

In some embodiments the first two catalytic beds traversed by the gas flow, namely the first de-NOx bed and the de-N2O bed, can be made of the same catalyst. In that case, there can be no physical separation between said two beds.

The invention will now be elucidated with reference to a non-limitative example of preferred embodiments.

DETAILED DESCRIPTION

Figure 1:
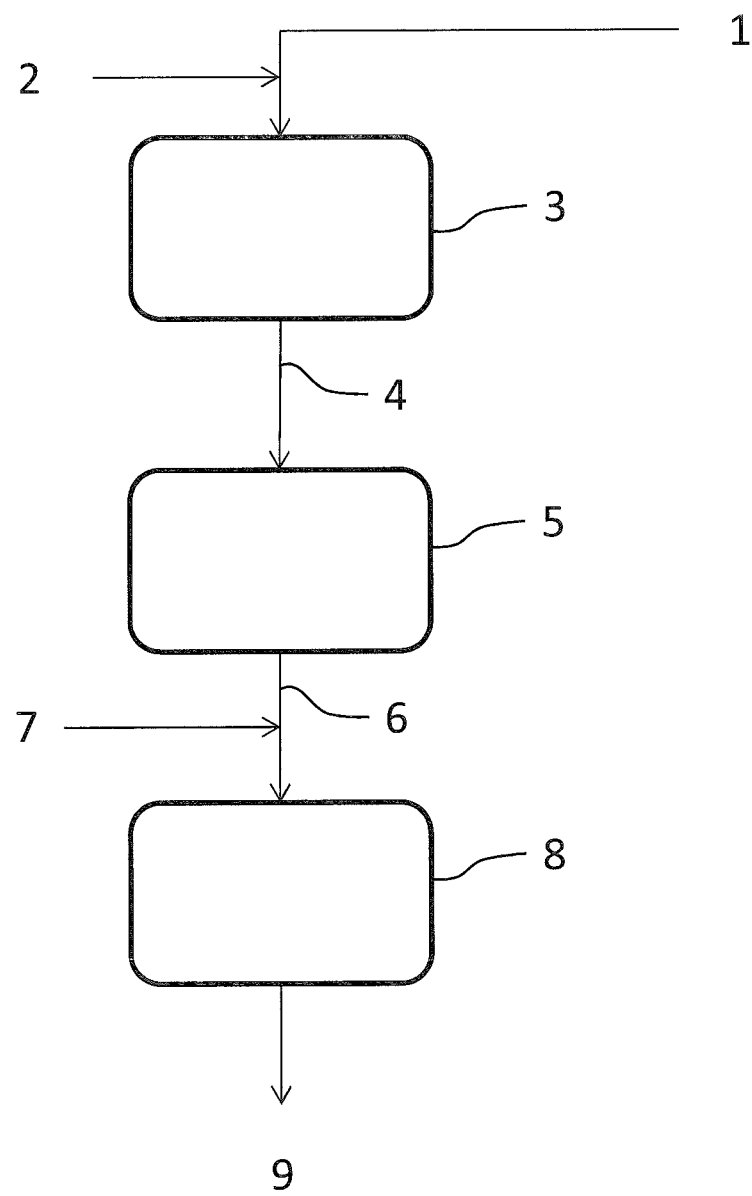
FIG. 1 is a scheme of a method of removing NOx and N2O from a gas according to an embodiment of the invention.

Referring to FIG. 1, a gas current 1 containing NOx and N2O is added with ammonia 2 and passed over a first de-NOx catalytic bed 3.

The majority of NOx contained in the input gas 1 are removed in the bed 3 by reaction with the added ammonia. The amount of ammonia 2 is determined in such a way that no ammonia remains in the effluent of the bed 3.

Then, a low-NOx and substantially ammonia-free gas 4 is collected from the first de-NOx bed 3. The content of NOx in the gas 4 is preferably determined as a function of the N2O in the input gas 1, namely the content of NOx in the gas 4 is the minimum content which is necessary or appropriate to allow a subsequent removal of N2O.

The gas 4 is then passed over a de-N2O catalytic bed 5. The effluent 6 of said de-N2O catalytic bed 5 is added with a second amount of ammonia 7 and is passed over a second de-NOx catalytic bed 8 for a further removal of NOx. The effluent 9 is a purified gas with a low content of NOx and N2O.

The second amount of ammonia 7, which is preferably smaller than the first amount 2, is controlled as a function of the NOx contained in the gas 6, and to match a target NOx content in the effluent 9.

Preferably, the content of NOx in the gas 6 is between 50 and 200 ppm and the ammonia 7 is determined accordingly. The target NOx in the gas 9 is generally determined by applicable law, for example less than 25 ppm may be prescribed.

The small amount of ammonia 7 can be precisely regulated to avoid ammonia slip in the effluent 9. Thanks to the invention, accuracy of the flow control of ammonia 7 (in percent) is less stringent than the prior art, for example around 10% or greater.

Figure 2:
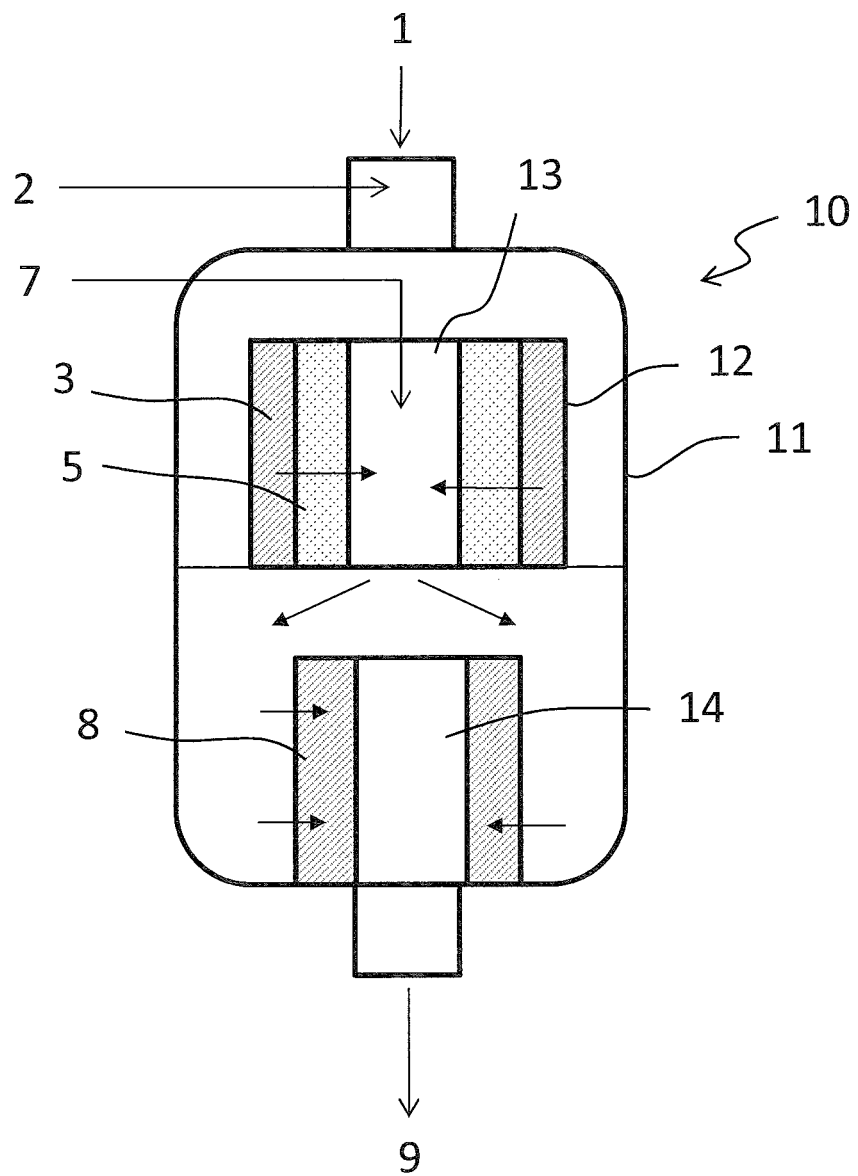
FIG. 2 is a scheme of an apparatus to carry out the method of the invention, according to a preferred embodiment.

FIG. 2 is a simplified scheme of an apparatus 10 to carry out the method of the invention, wherein the three beds 3, 5 and 8 are contained in a single pressure vessel 11 and are traversed radially by the gas (radial-flow).

The catalytic beds are for example contained within baskets with gas permeable walls, for example perforated or slotted walls. The path of the gas is shown by the arrows of FIG. 2.

More in detail, the FIG. 2 shows an embodiment where the first de-NOx bed 3 and the de-N2O bed 5 are arranged concentrically in an upper part of the apparatus 10 while the second de-NOx bed 8 is contained in a lower part of the same.

The flow of incoming gas 1 and ammonia 2 is distributed by a permeable wall 12 through the outer de-NOx bed 3 and traverses radially said bed 3 and the inner de-N2O bed 5. The effluent of said inner bed 5 (stream 6 of FIG. 1) is collected in a central collector 13 where the second amount of ammonia 7 is provided. Then, the gas mixture passes in the lower part of apparatus 10 and traverses the second de-NOx bed 8. The effluent 9 of said second de-NOx bed 8 is collected in a collector 14.

Example

An off gas 1 from synthesis of nitrous acid has a flowrate of 4100 kmol/h and contains 700 ppm of NOx (NO+NO2) and 900 ppm of N2O. The gas 1 further contains 3% of oxygen.

The first de-NOx catalytic bed 3 has a copper exchanged zeolite catalyst and a space velocity of 15000 $h^{-1}$. Ammonia 2 is added in an amount corresponding to 560 ppm in the gas 1. After a passage over said bed 3, the effluent gas stream 4 contains 145 ppm of NOx and 950 ppm of N2O.

The de-N2O catalytic bed 5 has an iron exchanged zeolite catalyst and has a space velocity of 5000 $h^{-1}$. After a passage over said de-N2O bed 5, the effluent gas 6 still contains 145 ppm of NOx but only 20 ppm of N2O.

Said gas 6 is added with ammonia 7 and passed over the second de-NOx catalytic bed 8. The set point of the flowrate of ammonia 7 corresponds to 140 ppm in the gas, being a function of the NOx still contained in the gas.

The second de-NOx catalytic bed 8 preferably has a vanadium oxide catalyst and a space velocity of 15000 $h^{-1}$.

The effluent 9 has NOx<25 ppm and contains no or a negligible amount of ammonia, typically less than 2 ppm of ammonia.

What is claimed is:

1. A method for reducing the content of nitrogen oxides NOx and nitrous oxide N2O in an input gas, comprising the steps of:
   - treating said gas with a first amount of a NOx reducing agent in a first de-NOx catalytic bed;
   - treating the effluent of said first de-NOx catalytic bed in at least one de-N2O catalytic bed for removal of N2O;
   - treating the effluent of said at least one de-N2O catalytic bed with a second amount of a NOx reducing agent in a second de-NOx catalytic beds;
   - wherein the second amount of NOx reducing agent is determined on the basis of the NOx contained in the gas at the outlet of the first de-NOx catalytic bed or at the outlet of the De-N2O catalytic bed.

2. The method according to claim 1, comprising the steps of mixing the input gas with said first amount of NOx reducing agent before admission into the first de-NOx catalytic bed, and mixing the effluent gas of said at least one de-N2O catalytic bed with said second amount of NOx reducing agent before admission into the second de-NOx catalytic bed.

3. The method according to claim 1, wherein the first amount of NOx reducing agent is completely reacted with NOx in the first de-NOx catalytic bed, so that the effluent of said first de-NOx catalytic bed is substantially free from said reducing agent.

4. The method according to claim 1, wherein the majority of NOx contained in the input gas are removed in the first de-NOx catalytic bed, and the residual amount of NOx in the effluent of said catalytic bed is required for the subsequent treatment over said de-N2O catalytic bed.

5. The method according to claim 1, wherein said second amount of NOx reducing agent is smaller than the first amount.

6. The method according to claim 1, wherein the concentration of NOx in the effluent of the first de-NOx catalytic bed is not greater than 200 ppm.

7. The method according to claim 6, wherein the concentration of NOx in the effluent of the first de-NOx catalytic bed is in the range 50 to 200 ppm.

8. The method according to claim 1, wherein the NOx reducing agent is or contains ammonia.

9. The method according to claim 8 wherein said second de-NOx catalytic bed comprises a catalyst which is iron exchanged zeolite and the gas admitted into said second catalytic bed has a molar ratio of NH3/NOx greater than 1.33.

10. The method according to claim 9, said ratio being greater than 1.4 and preferably in the range 1.4 to 1.6.

11. The method according to claim 10, said ratio being greater than 1.4 and preferably about 1.5.

12. The method according to claim 9, wherein the first de-NOx catalytic bed comprises a catalyst which is iron exchanged zeolite and operates with a molar ratio of NH3/NOx less than 1.

13. The method according to claim 1, wherein: the catalyst of the first de-NOx bed is copper exchanged zeolite, and/or the catalyst of the de-N2O bed is iron exchanged zeolite, and/or the catalyst of the second de-NOx bed is Vanadium oxide.

14. The method according to claim 1, wherein: the first de-NOx bed has a copper exchanged zeolite catalyst and a space velocity of 15'000 h−1; the de-N2O bed has iron exchanged zeolite catalyst and a space velocity of 5'000 h−1; the second de-NOx bed has a Vanadium oxide catalyst and a space velocity of 15'000 h−1.

15. The method according to claim 1, wherein the effluent of the second de-NOx bed has NOx<25 ppm; N2O<30 ppm; NH3<2 ppm.

16. The method according to claim 1, wherein the input gas is a combustion exhaust gas or a process gas.

17. The method according to claim 16, wherein the input gas is an offgas of a process for making nitric acid.

\* \* \* \* \*